United States Patent [19]

Sasaki et al.

[11] Patent Number: 4,604,859
[45] Date of Patent: Aug. 12, 1986

[54] AGRICULTURAL BALER

[75] Inventors: Chuichi Sasaki; Haruo Sasaki; Katumi Miyajima, all of Towada; Kaoru Ebisawa, Nohejimachi, all of Japan

[73] Assignee: Sasaki Nouki Kabushiki Kaisha, Towada, Japan

[21] Appl. No.: 734,918

[22] Filed: May 16, 1985

[51] Int. Cl.⁴ ............................................. A01D 59/00
[52] U.S. Cl. ........................................ 56/341; 100/179; 100/188 R
[58] Field of Search ................................. 56/341–343; 100/179, 188 R, 185, 186, 189

[56] References Cited

U.S. PATENT DOCUMENTS

| | | | |
|---|---|---|---|
| 3,103,775 | 9/1963 | Evans et al. | 56/341 |
| 3,177,641 | 3/1965 | Powell et al. | 56/341 |
| 3,636,869 | 1/1972 | D'Acremont et al. | 56/341 |
| 3,880,073 | 4/1975 | Eberly | 56/341 |
| 3,943,845 | 3/1976 | Mecklin et al. | 56/341 |
| 4,011,710 | 3/1977 | Schmitt | 56/341 |
| 4,136,510 | 1/1978 | Crawford et al. | 56/341 |

Primary Examiner—Robert P. Swiatek
Assistant Examiner—John G. Weiss
Attorney, Agent, or Firm—Frishauf, Holtz, Goodman & Woodward

[57] ABSTRACT

An agricultural baler includes a pick-up device, a compressing device and a bundling device, and is driven by the power of a tractor. A bale chamber is transversely provided with respect to the direction of running of the tractor, and a linkage is provided for directly mounting the baler on the tractor. The compressing device and the bundling device are contained in the bale chamber.

9 Claims, 15 Drawing Figures

AGRICULTURAL BALER

BACKGROUND OF THE INVENTION

This invention relates to an agricultural baler, and more particularly an agricultural baler mounted directly on a tractor.

To perform efficient work on an inclined ground surface, due to the ability of the tractor, working in the direction of an equi-level line is generally desirable. However, the prior art baler comprises a trailer having two wheels and which is pulled by a tractor. The baler is connected to the rear of the tractor by a single pivot pin so that it can not operate in the direction of an equi-level line on the inclined ground surface. In other words, since a machine, soil and crops are always subjected to an inclined component of their weight, where the inclined ground surface exceeds a predetermined inclination angle, both the tractor and trailer laterally slide along the inclined surface. Unless such lateral sliding is prevented, the tractor and trailer get out of a straight formed windrow so that the operator tends to correct the direction of movement of the machines. However, owing to the characteristic of the trailer pivoted by a single shaft, the amount of movement of the trailer is larger than that of the tractor as shown in FIGS. 6A and 6B, and the trailer tends to move along a wavy path. For this reason the prior art trailer type baler can not move straight forwardly on the inclined ground surface, thus making it difficult to operate in the direction of the equi-level line.

Since the prior art baler is connected to the rear end of the tractor, the operator cannot work while observing the pick-up state with his eyes so that the operator can not run the machines with their centers aligned with the center line of the windrow. This not only decreases the working efficiency but also decreases safety because the operator must work while looking around to the rear.

Furthermore, as the prior art baler is connected to the rear end of the tractor, it is impossible to compose a pick-up operation, a bundling operation and post operations such as an entraining operation so that its working efficiency is low. Furthermore, the prior art baler can not compose a pick-up operation, a bundling operation and advance operations such as a grass gathering operation.

SUMMARY OF THE INVENTION

Accordingly, an object of this invention is to provide a novel agricultural baler capable of working in the direction of an equi-level line.

Another object of this invention is to provide an improved agricultural baler capable of improving the turning characteristic, thereby improving the packing operation of materials such as rice plant straws in a small rice plant field.

Still another object of this invention is to provide an improved baler that can compose advance or post operations with bundling operation of raw materials, thereby improving the working efficiency.

A further object of this invention is to provide an agricultural baler enabling visual operation by connecting a baler to the front portion of a tractor, thereby improving the working efficiency and assuring the operation safeness.

According to this invention there is provided an agricultural baler comprising pick-up means, compressing means, and bundling means and being driven by the power of a tractor. The baler includes a bale chamber transversely provided with respect to the direction of running of the tractor, the compressing means and the bundling means being contained in the bale chamber, and link means for directly mounting the baler on the tractor.

BRIEF DESCRIPTION OF THE DRAWINGS

FIGS. 6A and 6B are diagrammatic plan views showing the running states of a prior art baler in which FIG. 6A shows a state of correction movement to the mountain side and FIG. 6B shows a state of correction movement to the valley side;

FIGS. 7 through 10 show a modified embodiment of the baler according to this invention in which FIG. 7 is a left side view;

FIG. 8 is a diagrammatic plan view showing a motion transmission mechanism of the baler;

FIG. 9 is a sectional view showing essential elements of the mechanism shown in FIG. 8;

FIG. 10 is a side view of the mechanism shown in FIG. 8;

DESCRIPTION OF THE PREFERRED EMBODIMENTS

Figure 1:
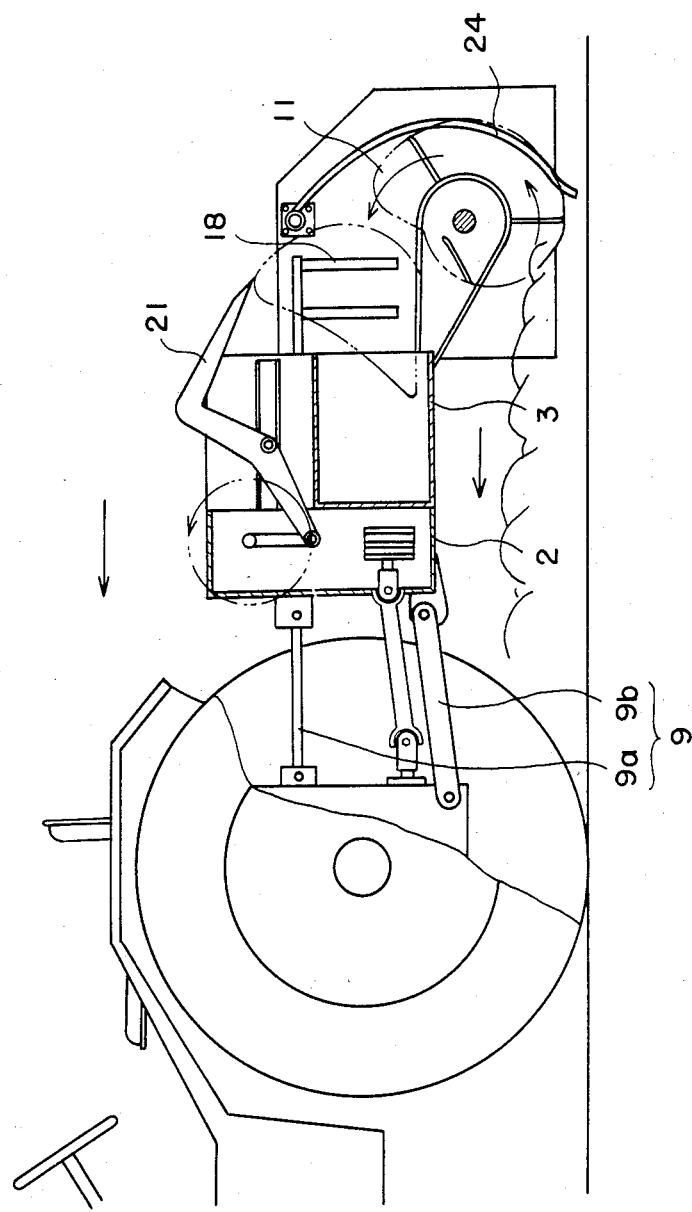
FIG. 1 is the left side view of one embodiment of the baler according to this invention.
Figure 2:
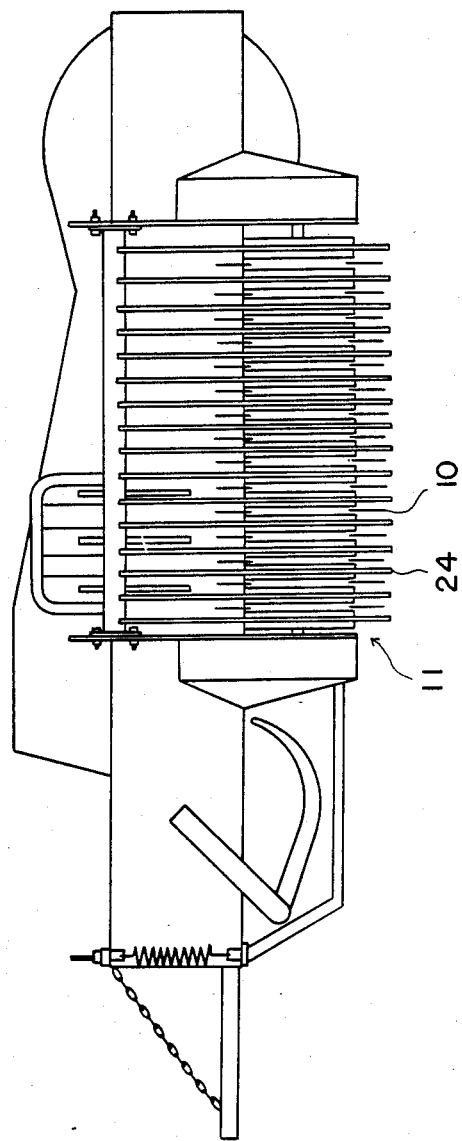
FIG. 2 is a front view of the baler.
Figure 3:
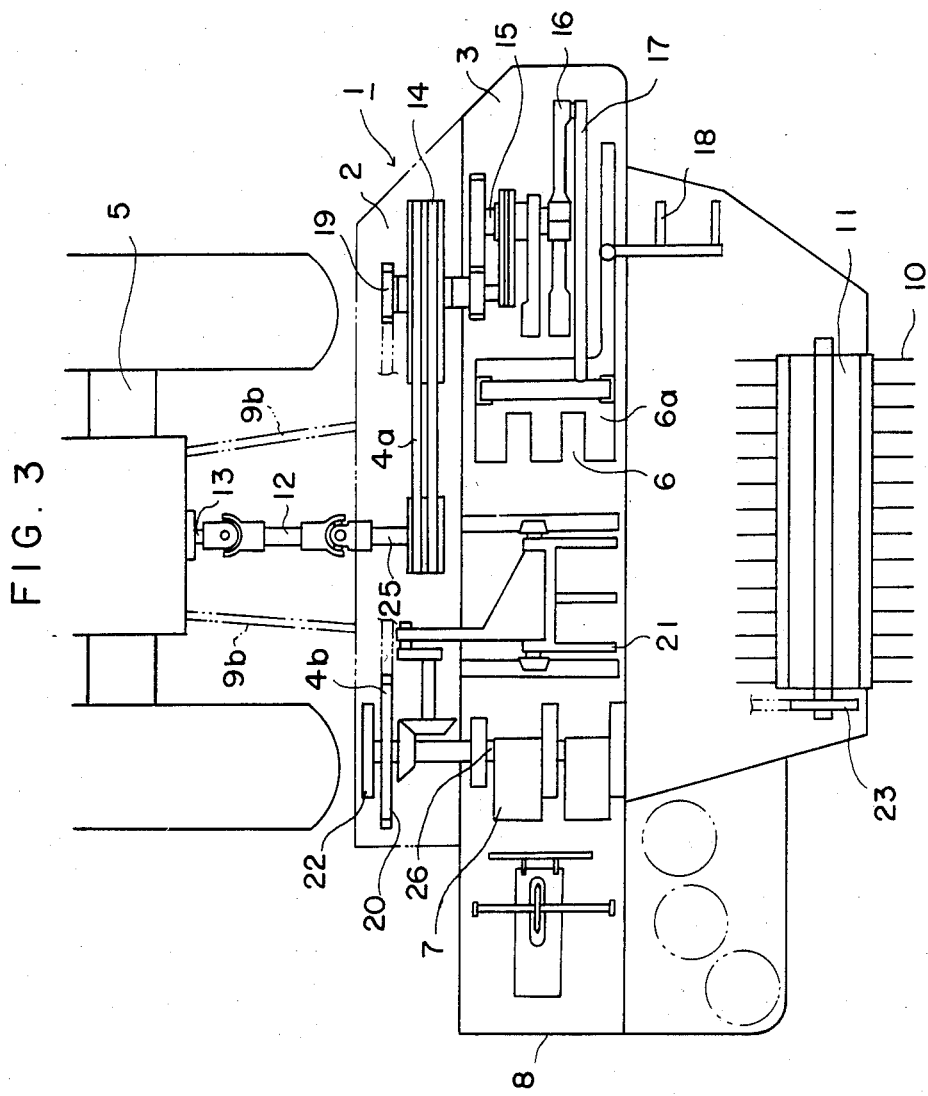
FIG. 3 is a plan view showing the motion transmission mechanism of the baler.

A first embodiment of the baler of this invention shown in FIGS. 1-3 comprises a bale casing 1 in the form of an elongated box, the casing 1 comprising a driving chamber 2 containing driving devices 4a and 4b, and a bale chamber 3 having a length larger than the width of a tractor 5. The bale chamber 3 is positioned transverse to the direction of running of the tractor 5 and contains therein a compressing device 6 made up of a reciprocating plunger 6a, and a bulging device 7. One end of the chamber 3 bulging over the width of the tractor 5 is opened to form a discharge port 8. In this embodiment, a link mechanism 9 is a three point link comprising a top link 9a and a pair of lower links 9b, one end of respective links being pivotally connected to the rear portion of the tractor 5, the other ends being pivotally connected to front surface of the casing 1. The baler may be fixedly secured to the tractor 5 in which case a pick-up device to be described later is constructed to be movable in the vertical direction. A two point link or a four point link can be used as the link mechanism. In front of the bale chamber 3 is provided a pick-up device 11 having a plurality of tines 10. The pick-up device 11 is disposed with its center aligned with the center of the body of the tractor 5. A blower suction type or other type of pick-up device may be utilized.

There are also provided a universal joint 12 which transmits the power from the PTO shaft 13 of the tractor 5 to a main shaft 15 via a counter wheel 14 of the driving device 4a, a rotary arm 16 secured to the main shaft 15, and a connecting rod 17 pivotally connected to one end of the rotary arm 16, the other end of the connecting rod 17 being secured to the plunger 6a. An outer fork 18 is secured to the base portion of the plunger 6a to reciprocate therewith.

The driving device 4b is supplied with power from the motion transmission wheel 19 of the driving device 4a through a motion transmission wheel 20 driven by a chain or the like motion transmitting means for driving a bundling device 7 and an inner fork 21. A motion transmission wheel 22 coaxial with the motion transmission wheel 20 is coupled with a motion transmission wheel 23 through a belt or the like motion transmitting means for rotating the pick-up device 11.

Figure 4:
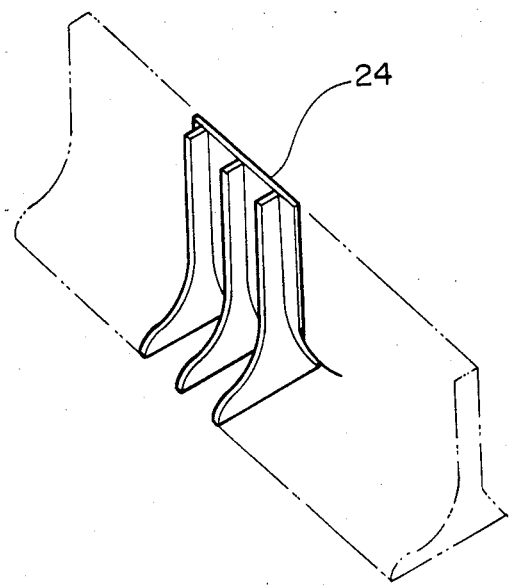
FIG. 4 is a perspective view showing another example of a guide member.

In this embodiment, the agricultural baler of this invention is connected to the rear side of the tractor 5. In this case a guide member 24 is located at a position close to the rear side of the pick-up device 11 to extend along the locus of rotation of the tines 10 of the pick-up device 11. The guide member 24 is made of spring steel and constructed as a comb teeth shape corresponding to the construction of the tines 10. The guide member 24 extends downwardly to a position at substantially the same level of the lower ends of the tines 10. As shown in FIG. 4, the guide member 24 is constructed as a plate shaped unit formed with a plurality of teeth, so that the guide member can be exchanged by an one touch operation. The reason for mounting the guide member 24 to the rear side of the pick-up device 11 lies in that it guides the gathering of grass such as the rice plant straws and to prevent scattering of the straws because the direction of rotation of the pick-up device 11 is opposite to the direction of advance of the tractor 5. The guide member 24 is not always necessary when the pick-up device of the rice plant straws or the like is suitably modified. Reference numeral 25 designates an input shaft, and 26 a driving shaft.

The agricultural baler having the construction described above is used by connecting it to the front end or the rear end of the tractor 5. The embodiment shown in FIG. 1 is adapted to be connected to the rear end. The rice plant straws or the like picked-up by the pick-up device 11 are supplied to a supply port formed at the central portion of the bale chamber 3, by outer forks 18 reciprocating together with the plunger 6a and then the straws are taken into the bale chamber 3 by the operation of inner forks 21. The straws are compressed by the compressing device 6, bundled by the bundling device 7 and then discharged to a collection station through the discharge port 8.

Figure 5A:
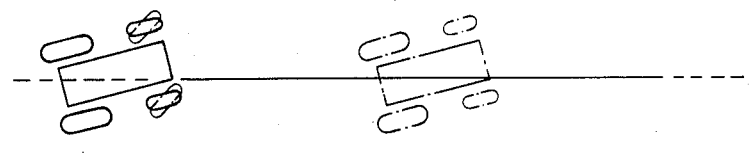
FIGS. 5A and 5B are diagrammatic plan and side views showing the running states of the baler.
Figure 5B:
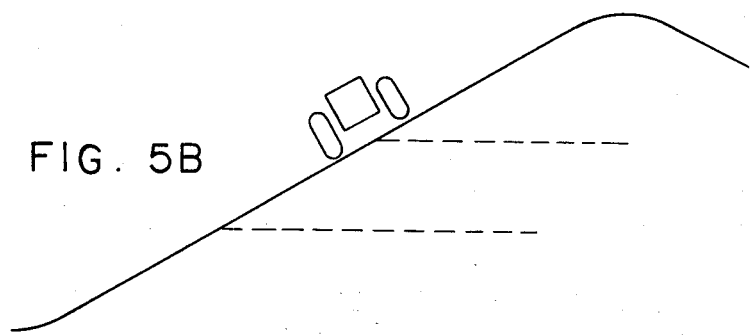
Figure 6A:
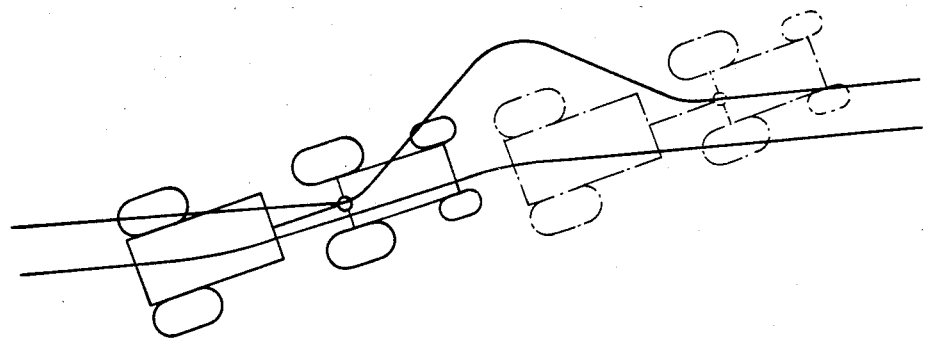
Figure 6B:
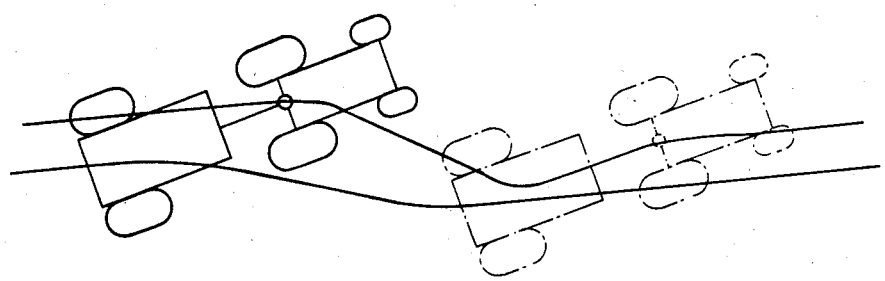
Figure 7:
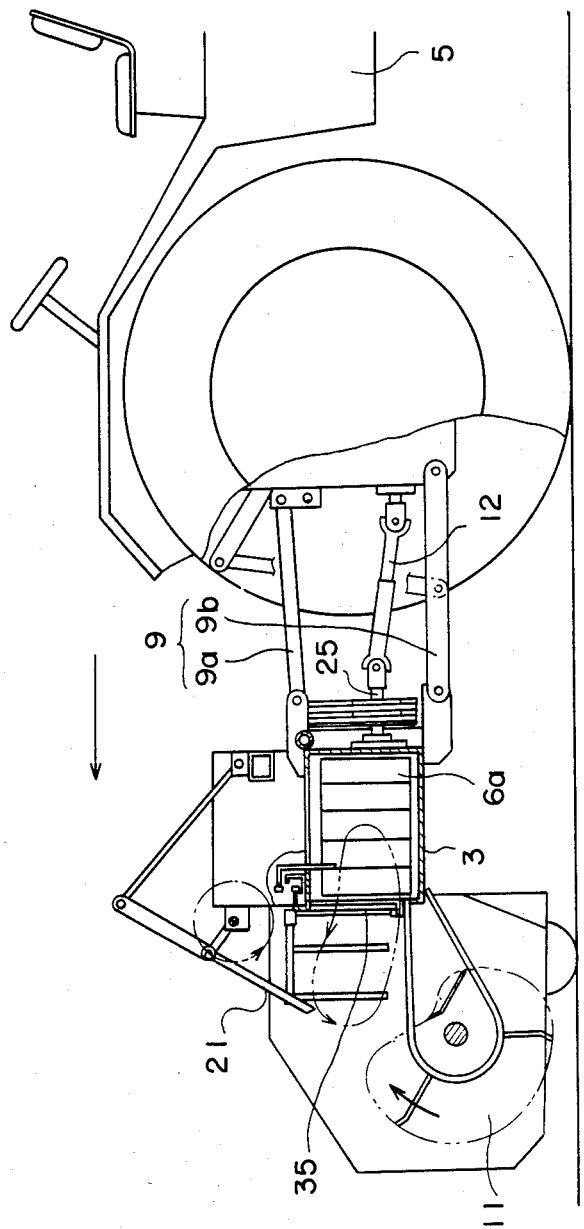
Figure 8:
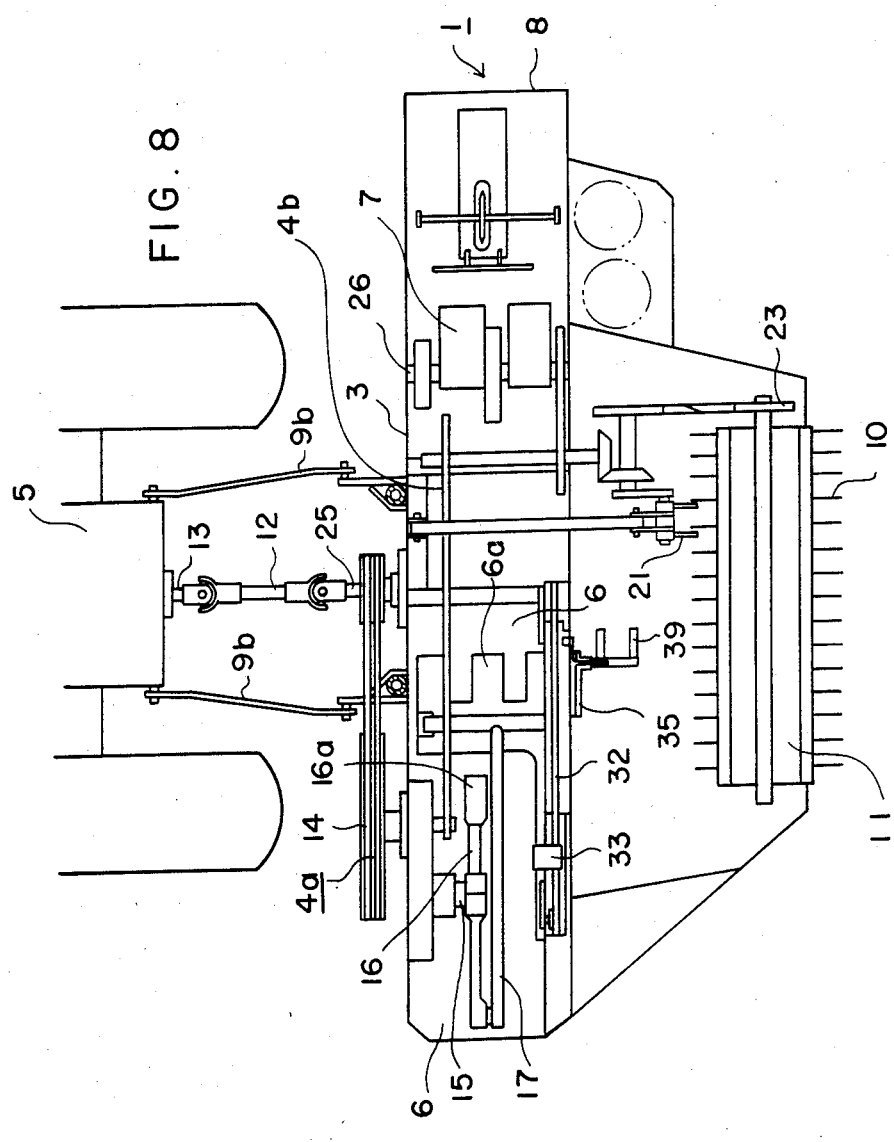
Figure 9:
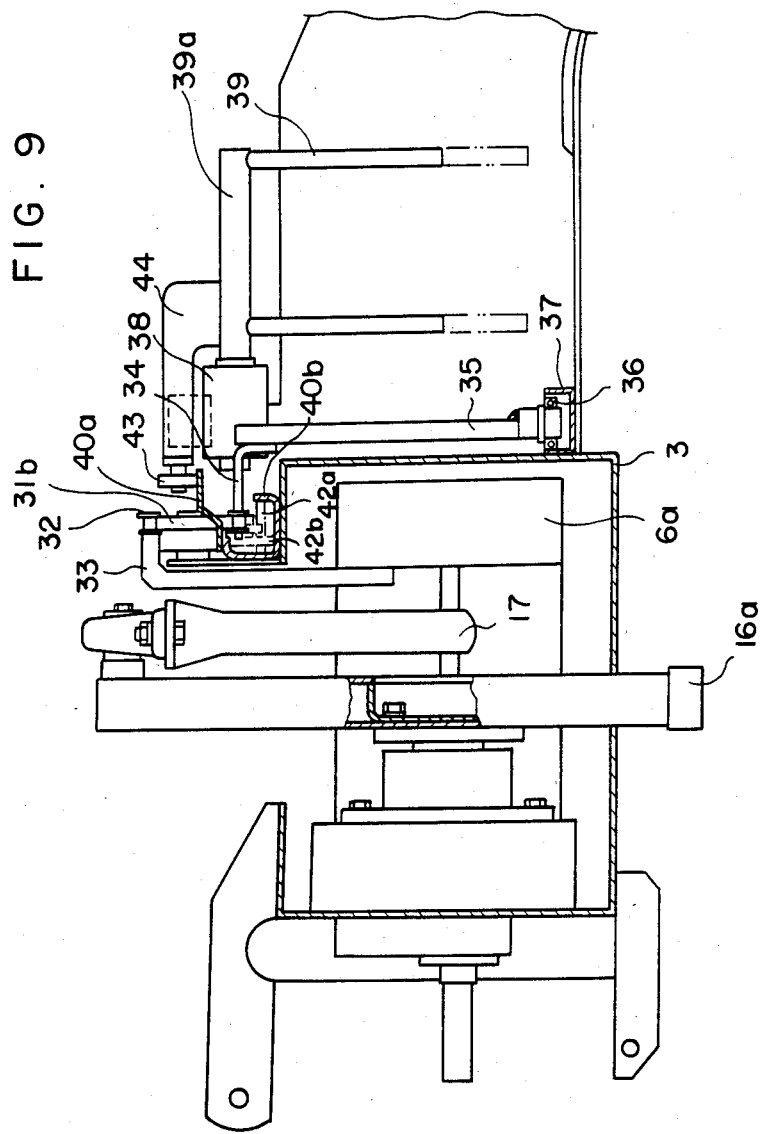
Figure 10:
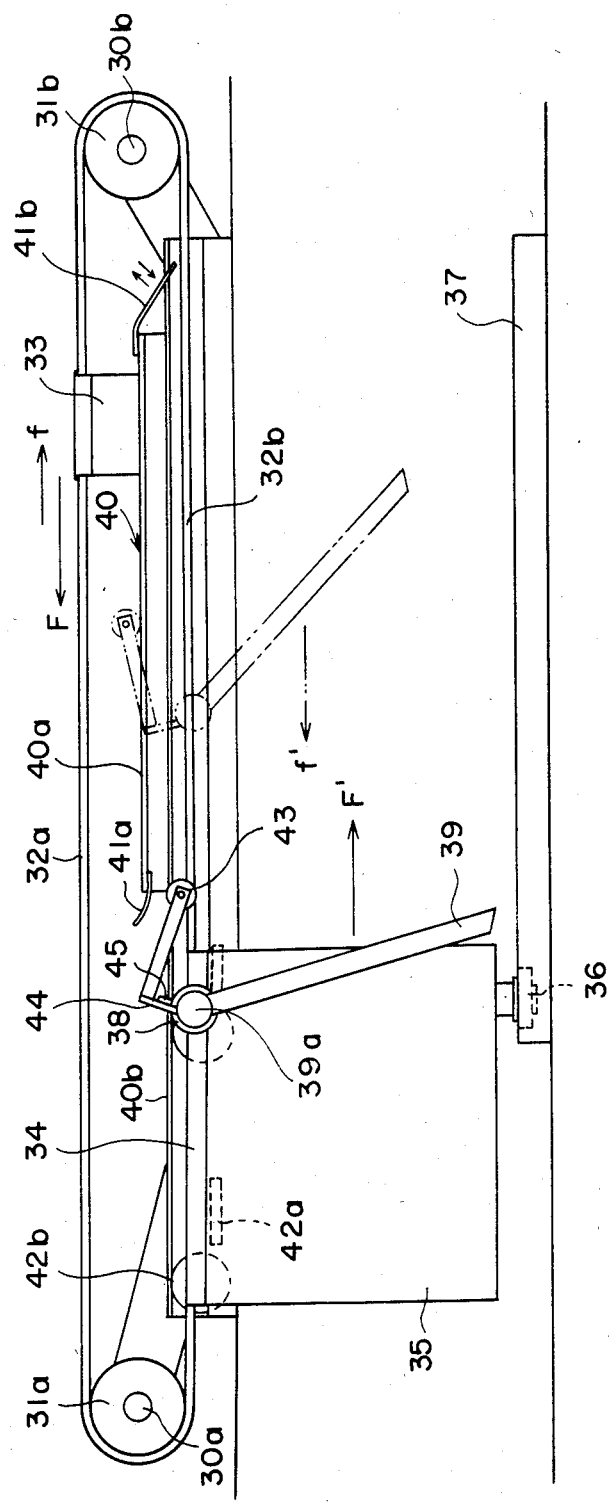

The agricultural baler of this invention is integral with the tractor 5 since the bailer is mounted directly on the tractor 5. When running independently, if the front wheels are manipulated to climb up a mountain without maintaining the center line of the track body in parallel with the equi-level line, the tractor 5 can run along the equi-level line as shown in FIGS. 5A and 5B. Consequently, the baler integral with the tractor 5 can run straight forwardly on an inclined ground surface so that it can operate in the direction of the equi-level line.

Since the compressing device 6 and the bundling device 7 which must be disposed with relatively large distance are contained in the bale chamber 3, it is possible to extremely decrease the length of the chamber relative to the prior art baler. For this reason, the rotating ability of the bailer can be improved proportionally. Since the compressing device 6 and the bundling device 7 which constitute substantial weight of the baler are arranged in the horizontal direction and since the driving devices 4a and 4b are located close to the compressing device 6 and the bundling device 7 and moreover since these devices 4a, 4b, 6 and 7 are disposed close to a connecting portion between the baler and the tractor 5 and the center of the pick-up device 11 is aligned with the center of the body of the tractor 5, distribution of the weight becomes optimum which is effective for realizing the balance of the tractor 5 during running, and for mounting the baler at the front end of the tractor. Since the pick-up device 11 is disposed with its center aligned with the center of the body of the tractor 5 when the tractor 5 runs across a windrow, the pick-up device 11 would automatically collide against the windrow, thus making easy operation and improving the workability. Moreover as the center of the baler is aligned with that of the tractor 5 and is not overhung as in the prior art construction, not only the running performance is improved but also the operating efficiency is improved. Furthermore, since the baler is pivotally connected to the tractor 5 when the baler is raised during idle or when not in use, for example during transfer, not only the transfer is rendered easy but also the damage of the baler can be prevented. Since the compressing device 6 and the bundling device 7 are disposed in the horizontal direction in the bale chamber 3 and since the discharge port 8 bulging over the width of the tractor 5 is formed at one end of the bale chamber 3, operations of compression, bundling and discharge can be made continuously.

Since the agricultural baler of this invention can be mounted on the front or rear end of the tractor, the baler can be used to match with the condition of the grass collecting station, thus improving the workability. Moreover, as the baler of this invention can be mounted on the rear or front end of the tractor it can be used economically.

When the baler is mounted on the front end of the tractor 5 through the link mechanism 9 the operator can operate while observing the picking up operation with his eyes so that he can run the baler with its center aligned with the center of the windrow. This not only improves workability but also can ensure safety because the operator can pay close attention to the driving of the tractor. Moreover, since the baler is mounted on the front end of the tractor, where a carriage connected to the rear end of the tractor and where the carriage and the baler are interconnected through a guide path, the bundles of rice plant straws or the like discharged from the baler can be directly received on the carriage without dropping the bundles onto the gathering station. Consequently, composite operations become possible wherein the picking up operation, the bundling operation and such post operation as a packing operation are interlocked, thereby greatly increasing the workability.

When the baler is mounted on the rear end of the tractor, where a grass gathering device is connected to the front end of the tractor, it will become possible to simultaneously perform the picking up operation, the bundling operation and such preoperation as grass gathering operation which also greatly improves the workability.

FIGS. 7 through 10 illustrate another embodiment of this invention. Although these figures show a front mounting tractor, it may be a rear mounting type. As shown, an endless chain 32 is passed about spaced apart sprocket wheels 31a and 31b rotatably mounted on shafts 30a and 30b respectively. A plunger 6a is secured to the upper run 32a of the endless chain 32 via a supporting plate 33 secured thereto. A counter weight 35 is secured to the lower run 32b of the endless chain 32 through a connecting member 34 secured thereto.

The counter weight 35 is made of a thick iron plate having substantially the same weight as the plunger 6a, and is provided with a swinging preventing roller 36 at its lower end. The roller 36 is guided by a rail 37 for reciprocating in opposite directions, that is in the direction (shown by arrows F and f) of movement of plunger 6a and in the opposite direction shown by arrows F' and f'. An outer fork 39 is rotatably mounted on a boss 38 secured to the upper end of the counter weight 35.

A guide rail 40 having a suitable length is provided in parallel with the endless chain 32. The guide rail 40 is constituted by a plate shaped upper piece 40a and a lower piece 40b having a L shaped cross-section. Tongues 41a and 41b made of thin elastic material and free to flex in the vertical direction are secured to the opposite ends of the upper piece 40a. A horizontal roller 42a provided for the base portion of the connecting member 34 and a vertical roller 42b slidably engage the lower piece 40b.

An attitude changing member 44 having a L shaped configuration and having a roller 43 on the front end is secured to the outer fork 39 so as to move the outer fork 39 on the guide rail 40. The roller 43 slides on the upper piece 40a of the guide rail 40 when the counter weight 35 connected to the outer fork 39 is retracted as shown by f' but is idle during the forward stroke F'. A stop member 45 is secured to the boss 38 for engaging attitude changing member 44 during the forward stroke F'.

A balance weight 16a is provided for an end of the rotary arm 16 close to the plunger 6a so as to prevent the vertical vibration caused by the reciprocating motion of plunger 6a.

The power from the tractor 5 is transmitted to the main shaft 15 from an input shaft 25 via driving mechanism 4a, whereby the rotary shaft 16 is rotated to reciprocate the plunger 6a in the direction of arrows F and f via connecting rod 17. Since plunger 6a is secured to the endless chain 32, the upper run 32a of the endless chain 32 is also driven in the same direction as plunger 6a. However, since sprocket wheels 31a and 31b are free to rotate about shafts 30a and 30b, the lower run 32b of the endless chain runs in a direction (shown by arrows F' and f') opposite to the direction of advance of the plunger 6a. Consequently, counter weight 35, the weight of which is substantially consistent with that of the plunger 6a, is reciprocated in a direction (shown by arrows F' and f') opposite to the direction of movement of the plunger 6a in an interlocked relation with the operation thereof. Consequently, it is possible to prevent transverse vibration caused by the reciprocating motion of the plunger 6a.

Since the outer fork 39 is connected to the counter weight 35, by preventing the transverse vibration caused by the reciprocating motion of plunger 6a, the raw material raking out power of the outer fork 39 is stabilized to prevent raw material left without being raked out. Moreover, as the transfer of the outer fork 39 is interlocked with plunger 6a, a correct transfer force can be ensured.

The outer fork 39 advances in the same directions F' and f' as the counter weight 35. When the outer fork 39 completes transfer of the raw material during the forward stroke F', the roller 43 at one end of the attitude changing member 44 secured to the outer fork 39 pushes tongue 41b of the guide rail 40 and advances beyond the tongue 41b. Then as the plunger 6a advances in the direction of arrow f, the roller 43 will ride over the tongue 41b so as to slide over the upper surface of the upper piece 40a of guide rail 40. Accordingly, the outer fork 39 will come to the return stroke f' together with the counter weight 35. However, since the attitude changing member 44 has a L shaped side configuration, the front end of the outer fork 39 rises as shown by dot and dash lines in FIGS. 9 and 10. As a consequence, rake back of the outer fork 39 can be prevented during the return stroke f'. When the roller 43 reaches the tongue 41a provided at the other end of the upper piece 40a of the guide rail 40, the roller 43 drops by its own weight so that the outer fork 39 returns to the original position shown by solid lines in FIG. 10.

The tongue 41a may be omitted. Instead of the tongue 41b, an inclined arc-shaped rail, now shown, may be provided at the end of the forward stroke F' so that the roller 43 slides along the upper surface of the arc-shaped rail at the end of transferring of the outer fork 39, thereby rotating the outer fork 39 about the shaft 39a to change its attitude. In this case, a return spring, not shown, may be provided, if necessary, at the rear surface of the outer fork 39.

Figure 11:
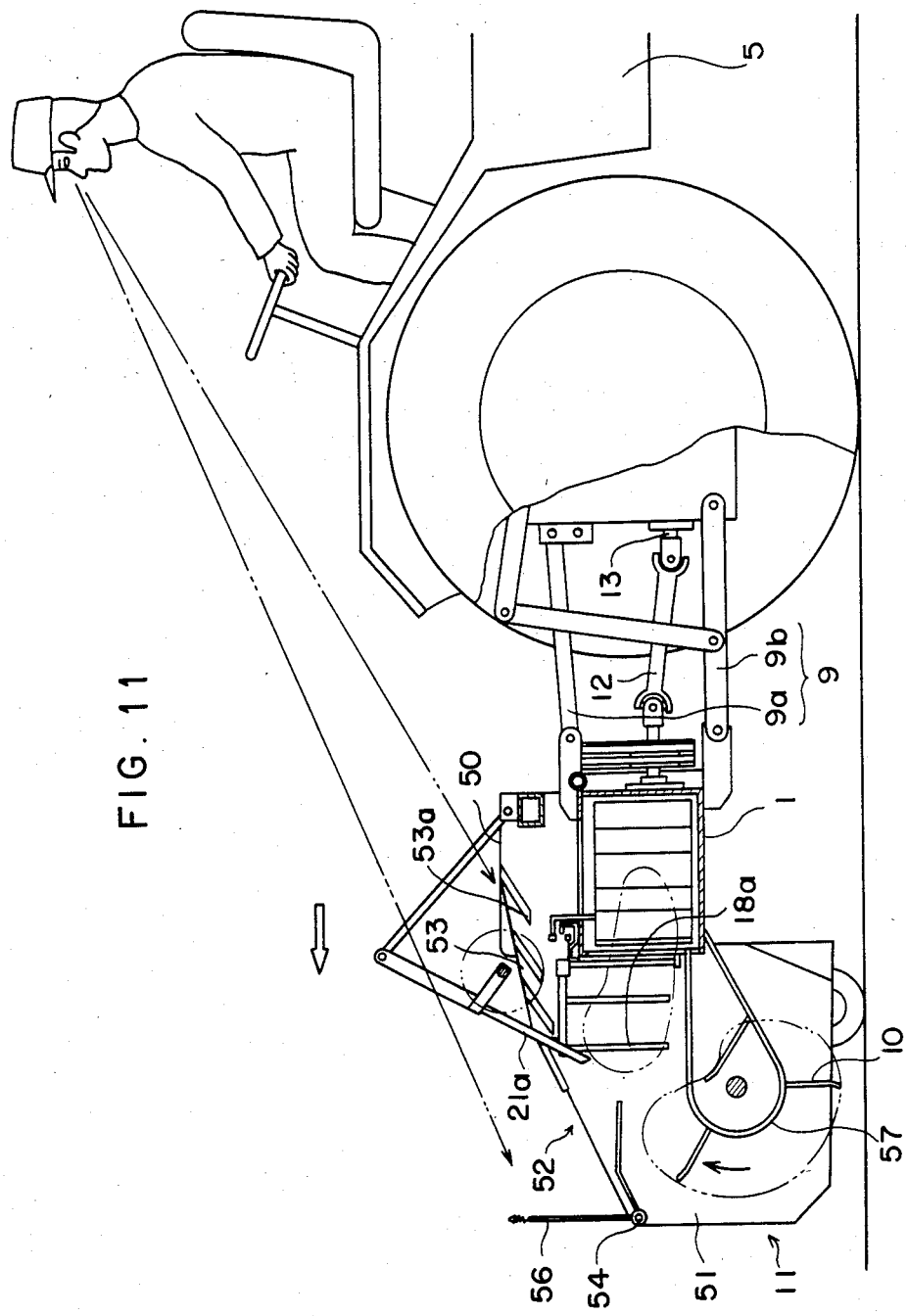
FIG. 11 is a side view of another embodiment of the baler.
Figure 12:
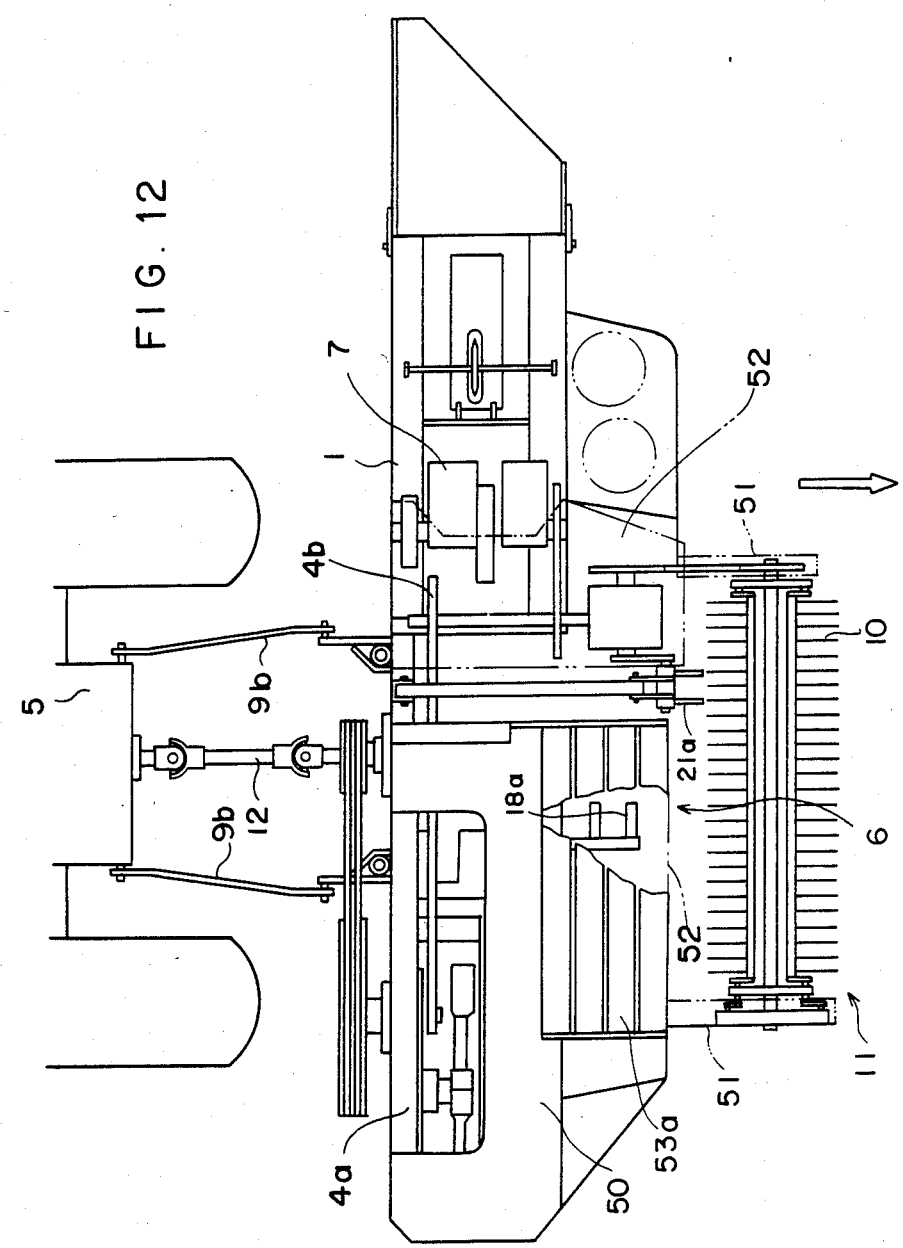
FIG. 12 is a diagrammatic plan view showing a motion transmission mechanism of the baler shown in FIG. 11.
Figure 13:
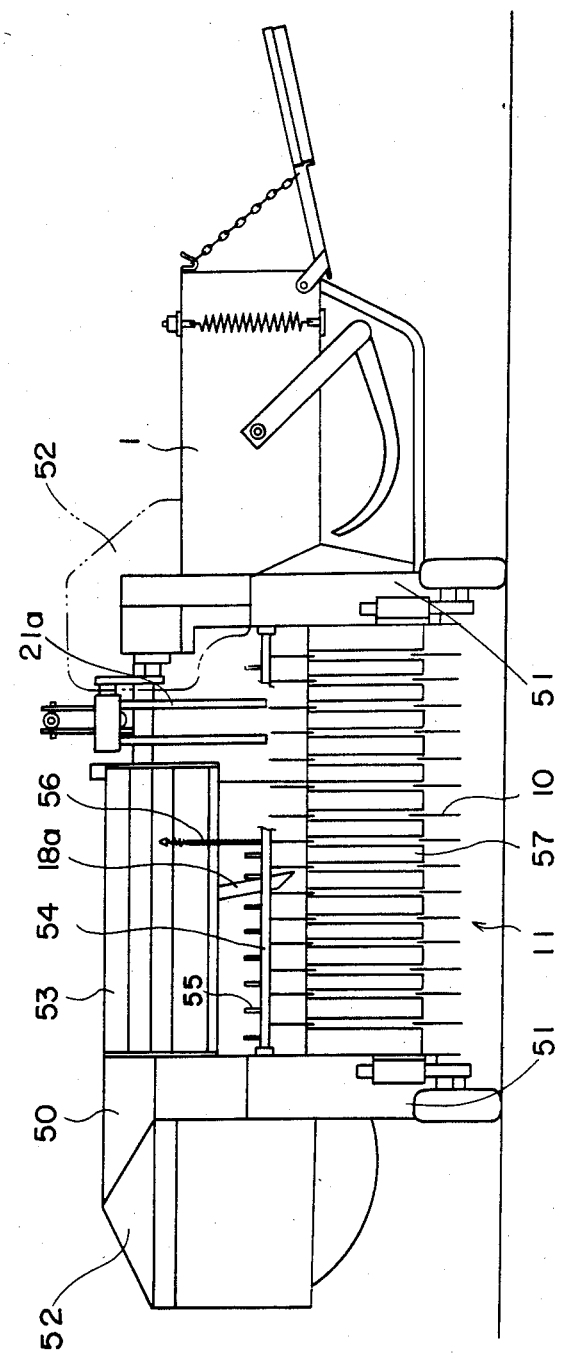
FIG. 13 is a front view of the baler shown in FIG. 11.

FIGS. 11–13 show still another embodiment of this invention. In this embodiment, the agricultural baler is mounted on the front portion of tractor 5. Driving devices 4a and 4b, an outer fork 18a, an inner fork 21a and a pick-up device 11 are covered by a cover 52 comprising an upper surface plate 50 and a pair of side plates 51. A visible member 53 is formed on the upper surface plate 50 at a position immediately above the outer fork 18a. The visible member 53 comprises inclined plates 53a which are disposed at proper spacings, transparent member, grid or net shaped member. The inclination angle of the inclined plate 53a is determined to align with the operator's eye line shown in FIG. 11. There are also provided a transverse tube 54 secured to the side plates 51 and provided with a plurality of press levers 55, a marker 56 vertically provided at the center of the transverse tube, and a rotor cover 57.

Since the baler has a construction as above described, it can perform safely such operations as the gathering, dispersion and packing of the raw materials as rice plant straws. Moreover, it is possible to exclude dust produced at the time of operation by the cover 52. Since the operator can operate while supervising the operating condition with the visible member 53, the operator can operate the tractor while observing the gathered or dispersed states of the raw materials or while following the center of the ridge of a previously piled up windrow. Moreover, as it is possible to adjust the tractor speed to a value corresponding to the absolute quantity of the raw material, correct operations can be ensured.

What is claimed is:

1. In an agricultural baler comprising pick-up means, compressing means, and bundling means, said baler being driven by power of a tractor,
   the improvement comprising:
   a bale chamber transversely provided with respect to a direction of running of said tractor;

said compressing means and said bundling means being contained in said bale chamber, said compressing means comprising a plunger reciprocating in said bale chamber to perform advance and return strokes;

a counter weight reciprocating in a direction opposite to the direction of movement of said plunger; and link means for directly mounting said baler on said tractor.

2. The agricultural baler according to claim 1, wherein said baler is mounted on a front portion of said tractor.

3. The agricultural baler according to claim 1, wherein said baler is mounted on a rear portion of said tractor.

4. The agricultural baler according to claim 1, comprising driving means for driving said pick-up means, and wherein said pick-up means has a center which is aligned with a center of a body of said tractor, said pick-up means being located adjacent a side of said bale chamber opposite to said driving means.

5. The agricultural baler according to claim 1, comprising a rotatable conveying means having opposite ends, and wherein said plunger and said counter weight are connected to said opposite ends of said rotatable conveying means, said counter weight being driven by said conveying means in an interlocked relation with an operation of said plunger.

6. The agricultural baler according to claim 5, further comprising an outer fork connected to said counter weight.

7. The agricultural baler according to claim 6, wherein said outer fork is disposed in parallel with said conveying means, through a hook shaped attitude changing member and conveyed on a guide rail provided with tongues at both ends thereof, said tongues being free to flex in the vertical direction so that an attitude of said outer fork is changed during the return stroke of said plunger.

8. The agricultural baler according to claim 1, further comprising:

a cover covering said baler; and visible members positioned on said cover at a position immediately above said compressing means.

9. The agricultural baler according to claim 8, wherein said visible members comprise a plurality of spaced apart inclined plates.

* * * * *